US012606031B2

(12) United States Patent
Varisco et al.

(10) Patent No.: US 12,606,031 B2
(45) Date of Patent: Apr. 21, 2026

(54) METHOD TO CONTROL AN ELECTRIC ROAD VEHICLE

(71) Applicant: FERRARI S.P.A., Modena (IT)

(72) Inventors: Stefano Varisco, Modena (IT); Andrea Nannini, Modena (IT); Daniele Genova, Modena (IT); Jacopo Canestri, Modena (IT); Lorenzo Laraia, Modena (IT); Alessandro Barone, Modena (IT)

(73) Assignee: FERRARI S.P.A., Modena (IT)

( * ) Notice: Subject to any disclaimer, the term of this patent is extended or adjusted under 35 U.S.C. 154(b) by 82 days.

(21) Appl. No.: 18/828,212

(22) Filed: Sep. 9, 2024

(65) Prior Publication Data

US 2025/0083537 A1 Mar. 13, 2025

(30) Foreign Application Priority Data

Sep. 11, 2023 (IT) ........................ 102023000018576

(51) Int. Cl.
*B60L 15/20* (2006.01)

(52) U.S. Cl.
CPC ....... *B60L 15/2054* (2013.01); *B60L 2240/12* (2013.01); *B60L 2240/16* (2013.01); *B60L 2240/463* (2013.01); *B60L 2250/26* (2013.01)

(58) Field of Classification Search
None
See application file for complete search history.

(56) References Cited

U.S. PATENT DOCUMENTS

| | | | | | |
|---|---|---|---|---|---|
| 11,235,667 | B1* | 2/2022 | Kao | .................... | B60L 15/2054 |
| 2014/0200777 | A1* | 7/2014 | Dufford | ............... | B60W 20/30 |
| | | | | | 701/54 |
| 2018/0281619 | A1* | 10/2018 | Suzuki | .................... | B60L 15/20 |
| 2021/0206254 | A1* | 7/2021 | Benedikt | ................. | B60K 6/36 |
| 2021/0387529 | A1* | 12/2021 | Oh | ........................ | B60W 20/00 |
| 2021/0387530 | A1* | 12/2021 | Oh | ....................... | F16H 61/0213 |
| 2021/0387531 | A1* | 12/2021 | Oh | ........................ | B60W 30/19 |

(Continued)

OTHER PUBLICATIONS

Italian Search Report for Application No. 202300018576; Filing Date: Sep. 11, 2023; Date of Mailing: Mar. 8, 2024; 8 pages.

(Continued)

*Primary Examiner* — Peter D Nolan
*Assistant Examiner* — Jacob Kent Besteman-Street
(74) *Attorney, Agent, or Firm* — CANTOR COLBURN LLP

(57) ABSTRACT

Method to control an electric road vehicle having the steps of: detecting a position of an accelerator pedal; detecting an activation of an upshift control and of a downshift control; establishing a plurality of virtual gears, each capable of being selected by acting upon the upshift control and upon the downshift control; determining the selected virtual gear depending on the actions exerted upon the upshift control and upon the downshift control; determining a torque objective to be applied to the drive wheels depending on the position of the accelerator pedal and depending on the selected virtual gear; and adding, at each change of the selected virtual gear, to the torque objective an additional torque profile which is impulsive and temporary and temporarily changes the development of the torque objective.

12 Claims, 5 Drawing Sheets

(56)        References Cited

U.S. PATENT DOCUMENTS

| | | |
|---|---|---|
| 2022/0084497 A1 | 3/2022 | Oh et al. |
| 2023/0249703 A1 | 8/2023 | Oh et al. |
| 2023/0302918 A1* | 9/2023 | Solt .................... B60L 15/2054 |
| 2023/0322096 A1* | 10/2023 | De Simone .......... B60W 50/14 |
| | | 701/22 |
| 2024/0399888 A1* | 12/2024 | Nishimine ............. B60H 1/249 |
| 2025/0083537 A1* | 3/2025 | Varisco ................ B60W 30/19 |
| 2025/0206150 A1* | 6/2025 | Isami .................... B60L 50/51 |
| 2025/0214453 A1* | 7/2025 | Kittaka ................. B62M 25/08 |

OTHER PUBLICATIONS

European Search Report for European Patent Application No. 24199157.9 dated Feb. 26, 2025.

* cited by examiner

METHOD TO CONTROL AN ELECTRIC ROAD VEHICLE

CROSS-REFERENCE TO RELATED APPLICATIONS

This patent application claims priority from Italian patent application no. 102023000018576 filed on Sep. 11, 2023, the entire disclosure of which is incorporated herein by reference.

TECHNICAL FIELD

The present invention relates to a method to control an electric road vehicle.

PRIOR ART

Historically, in the technological evolution concerning motor vehicles, it was necessary to introduce a gearshift (or speed change) system to overcome the mechanical limits imposed by the internal combustion engine, which, without the gearshift system, could not cover an adequate speed range.

In particular, a gearshift device is used which allows the transmission ratio to be varied to allow multiplication of the torque delivered by the engine and to adapt the rotation speed thereof to the rotation speed of the wheels (in order to be able to obtain high engine torques even at relatively low travelling speeds and to reach high speeds).

In the majority of motor vehicles this device is still the mechanically controlled gearbox, which allows the driver to be able to choose according to the conditions of use of the vehicle between different ratios i.e., between different gears (the number of gears varies according to the vehicle model).

Over the decades, starting from the need for the presence of a gearshift system dictated by the limits of the internal combustion engine, the opportunity arose to produce many types of gearshift systems, in particular with increasingly high performance (e.g., the known dual clutch gearbox). In this way, the gearshift system has become a distinguishing element among motor vehicle manufacturers and, as mentioned above, an instrument that involves the driver of the road vehicle.

In recent times, with the diffusion of electric powertrain systems, there was a break away from the internal combustion engine and hence the introduction of at least one electric motor, which solves the need to change gears, being perfectly capable of rapidly supplying the torque required to go from zero speed to maximum speed without any problems of transmission.

Although electric powertrain systems tendentially allow an improvement in performance, as they always exploit the maximum acceleration available for a certain speed, the involvement of the driver in making certain choices, e.g., which gear to use on a bend, is tendentially reduced, thus also reducing driving pleasure, especially in the case of high performance sports vehicles.

The patent application DE102014225441A1 describes a vehicle having a continuous mechanical transmission that allows simulation of a gear transmission.

The patent application EP23167190.0 describes a method to control an electric road vehicle having the steps of: establishing a plurality of virtual gears, detecting, following the activation of an interface system by a driver while driving, a selection for one of the virtual gears, and delivering an engine torque to the drive wheels depending on the selection of the virtual gears. Consequently, the driver can choose which virtual gear to select to vary the engine torque that is applied to the drive wheels accordingly, with the same pressure on the accelerator pedal.

The average driver of a high performance sports car is used to the sensations transmitted by a clutch gearbox and hence expects to feel a "torque gap" (i.e., an "acceleration gap" or a "deceleration gap") during a gearshift followed by an increase in the engine torque (i.e., in the acceleration) at the end of an upshift or an increase in the braking torque (i.e., in the deceleration) at the end of a downshift.

It is important to observe that the judgment expressed by drivers must be taken into the utmost consideration even when technically wrong, as the majority of drivers purchase a car (and above all a high performance sports car which is used mainly for "fun" driving rather than to satisfy the need for mobility) based on his or her perceptions and convictions and not based on objective criteria. In other words, the most important thing is not that the vehicle is actually high performance, but that the vehicle is perceived by drivers as being high performance and above all is perceived by drivers as being fun and engaging to drive.

The patent applications US2021387530A1, US2021387531A1 and US2023249703A1 describe a control method of an electric vehicle in which the behaviour of a conventional gearshift is simulated, generating at each virtual gearshift, the accelerometric sensation that reproduces the behaviour of a conventional gearshift.

DESCRIPTION OF THE INVENTION

The object of the present invention is to provide a method to control an electric road vehicle which allows driving pleasure to be increased and which is, at the same time, simple and inexpensive to produce.

According to the present invention, there is provided a method to control an electric road vehicle, as claimed in the appended claims.

The claims describe preferred embodiments of the present invention forming an integral part of the present description.

BRIEF DESCRIPTION OF THE DRAWINGS

The present invention will now be described with reference to the accompanying drawings, which illustrate some non-limiting examples of embodiment thereof, wherein.

PREFERRED EMBODIMENTS OF THE INVENTION

Figure 1:
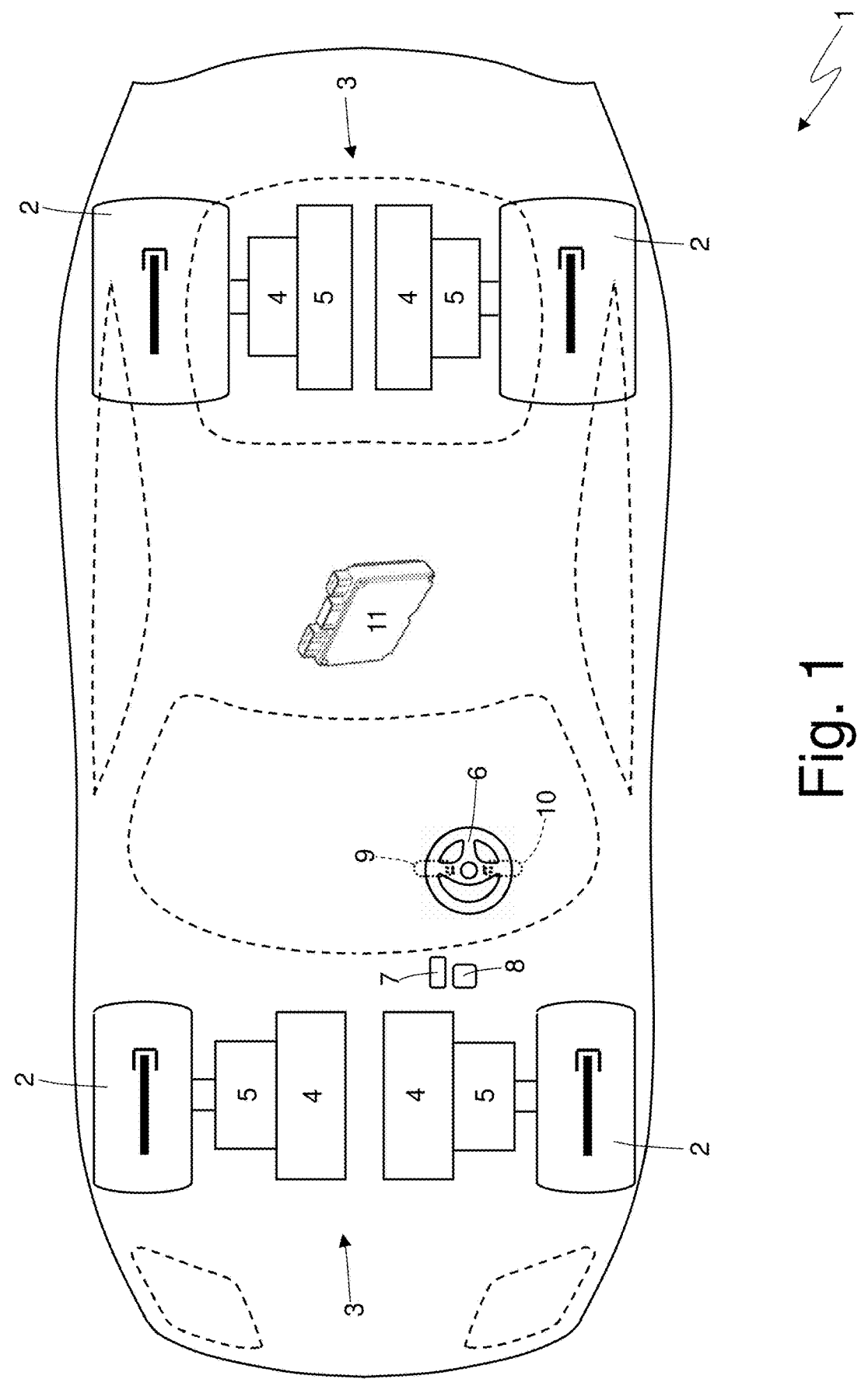
FIG. 1 is a schematic plan view of an electric road vehicle.

In FIG. 1, the number 1 indicates as a whole an electric road vehicle provided with four drive wheels 2 (two front drive wheels 2 and two rear drive wheels 2).

The vehicle 1 comprises an electric powertrain system 3 arranged in front position (i.e., connected to the two front drive wheels 2) and an electric powertrain system 3 which is arranged in rear position (i.e., connected to the two rear drive wheels 2), is structurally identical to the electric powertrain system 3 arranged in front position, and is completely mechanically independent and separate from the electric powertrain system 3 arranged in front position. According to a different embodiment, not illustrated, the vehicle 1 comprises a single electric powertrain system 3 (arranged in front position or in rear position) and therefore has only two drive wheels 2.

Each electric powertrain system 3 comprises a pair of reversible electric machines 4 (i.e., which can operate both as electric motor absorbing electrical energy and generating a mechanical engine torque, and as electric generator absorbing mechanical energy and generating electrical energy) provided with respective shafts and a pair of transmissions 5 which connect the electric machines 4 (i.e. the shafts of the electric machines 4) to the corresponding drive wheels 2 without the interposition of any clutch.

Each electric machine 4 is driven by a corresponding AC/DC electronic power converter (i.e., an "inverter") which is connected to an energy storage system provided with chemical batteries; i.e., each DC-AC electronic power converter is two-way and comprises a direct current side connected to the electrical energy accumulation system and a three-phase alternating current side which is connected to the corresponding electric machine 4.

The vehicle 1 comprises a passenger compartment, inside which a driving position is obtained, provided with a steering wheel 6, an accelerator pedal 7 and a brake pedal 8. The driving position also comprises an upshift control 9 and a downshift control 10 which, as will be explained below, can be used by the driver to select a virtual gear (generally in the case of performance driving on a track). Preferably, the controls 9 and 10 comprise two paddles which are connected to the steering wheel 6 and are arranged behind the wheel of the steering wheel 6 to be operated without removing the hands from the steering wheel 6.

The vehicle 1 comprises a control unit 11 which, among other things, monitors operation of the electric powertrain systems 3.

A plurality of virtual gears are established in advance, each of which is selectable by acting upon the upshift control 9 and upon the downshift control 10; in other words, it is possible to change the selected virtual gear sequentially in upshift by acting upon the upshift control 9 (passing from a lower virtual gear to a higher virtual gear) or in downshift by acting upon the downshift control 10 (passing from a higher virtual gear to a lower virtual gear). The virtual gears do not correspond to physical transmission ratios of the transmissions 5 (which constructionally are single gear, i.e., they do not entail variations of the physical transmission ratio) and represent an abstraction that can be used by the driver to change (as better explained below) the response of the electric powertrain systems 3 to the action on the accelerator pedal 7.

In use, i.e., while driving the road vehicle 1, the control unit 11 detects a position of the accelerator pedal 7 and a position of the brake pedal 8 to determine the driver's wishes regarding the driving mode. Moreover, the control unit 11 detects an activation of the upshift control 9 and an activation of the downshift control 10 to determine (when provided for) the selected virtual gear; i.e., the selected virtual gear is determined (when provided for) depending on the actions exerted upon the upshift control 9 and upon the downshift control 10.

Moreover, in use, the control unit 11 determines a torque objective $T_{obj}$ to be applied to the drive wheels 2 by the electric powertrain systems 3 depending on the position of the accelerator pedal 7 and (when provided for) also depending on the virtual gear selected (i.e., depending on the activation of the upshift control 9 and of the downshift control 10); it is important to observe that the torque objective $T_{obj}$ can be positive (causing the electric machines 4 to operate as motor) or be negative (causing the electric machines 4 to operate as generator). I.e., the control unit 11 drives the electric powertrain systems 3 to follow the torque objective $T_{obj}$ and hence to cause the two electric powertrain systems 3 to generate together an engine torque equal to the torque objective $T_{obj}$.

In general, the torque objective $T_{obj}$ is positive when the accelerator pedal 7 is at least partially pressed and is negative (to simulate the engine braking generated by an internal combustion engine) when the accelerator pedal 7 is released.

In general, the control unit 11 increases the torque objective $T_{obj}$ with the same position of the accelerator pedal 7 when a higher virtual gear is selected and the control unit 11 decreases the torque objective $T_{obj}$ with the position of the accelerator pedal 7 when a lower virtual gear is selected. When the accelerator pedal 7 is at least partially pressed the torque objective $T_{obj}$ is positive (i.e., is an engine torque) and hence the control unit 11 increases, in absolute value, the torque objective $T_{obj}$ with the same position of the accelerator pedal 7 when a higher virtual gear is selected and decreases, in absolute value, the torque objective $T_{obj}$ with the same position of the accelerator pedal 7 when a lower virtual gear is selected. Instead, when the accelerator pedal 7 is released the torque objective $T_{obj}$ is negative (i.e., is a braking torque) and hence the control unit 11 decreases, in absolute value, the torque objective $T_{obj}$ when a higher virtual gear is selected and the control unit 11 increases, in absolute value, the torque objective $T_{obj}$ when a lower virtual gear is selected.

Figure 2:
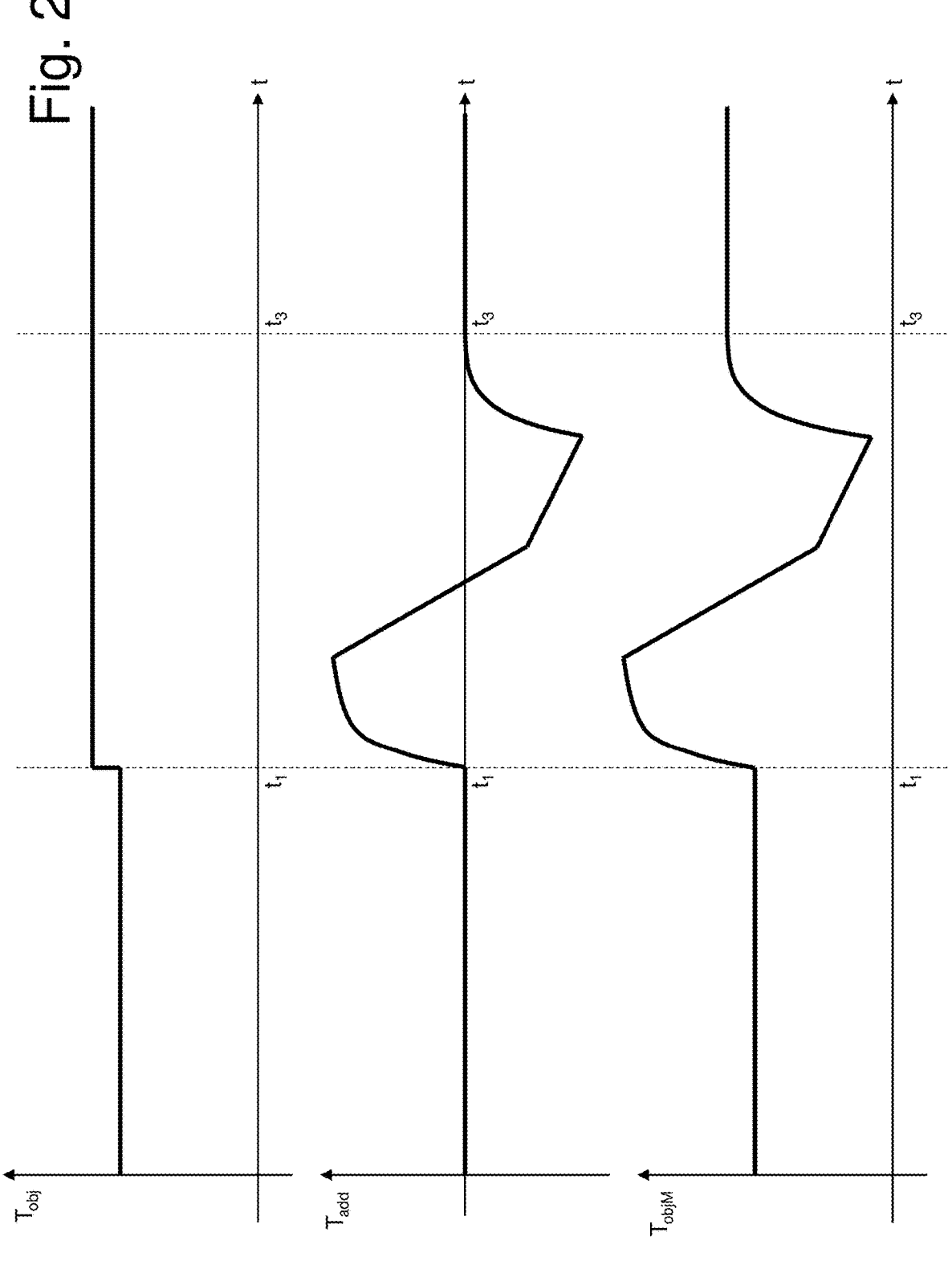
FIG. 2 illustrates graphs showing the evolution over time of a torque objective, of an additional torque profile, and of a torque objective changed in the case of a virtual upshift.
Figure 4:
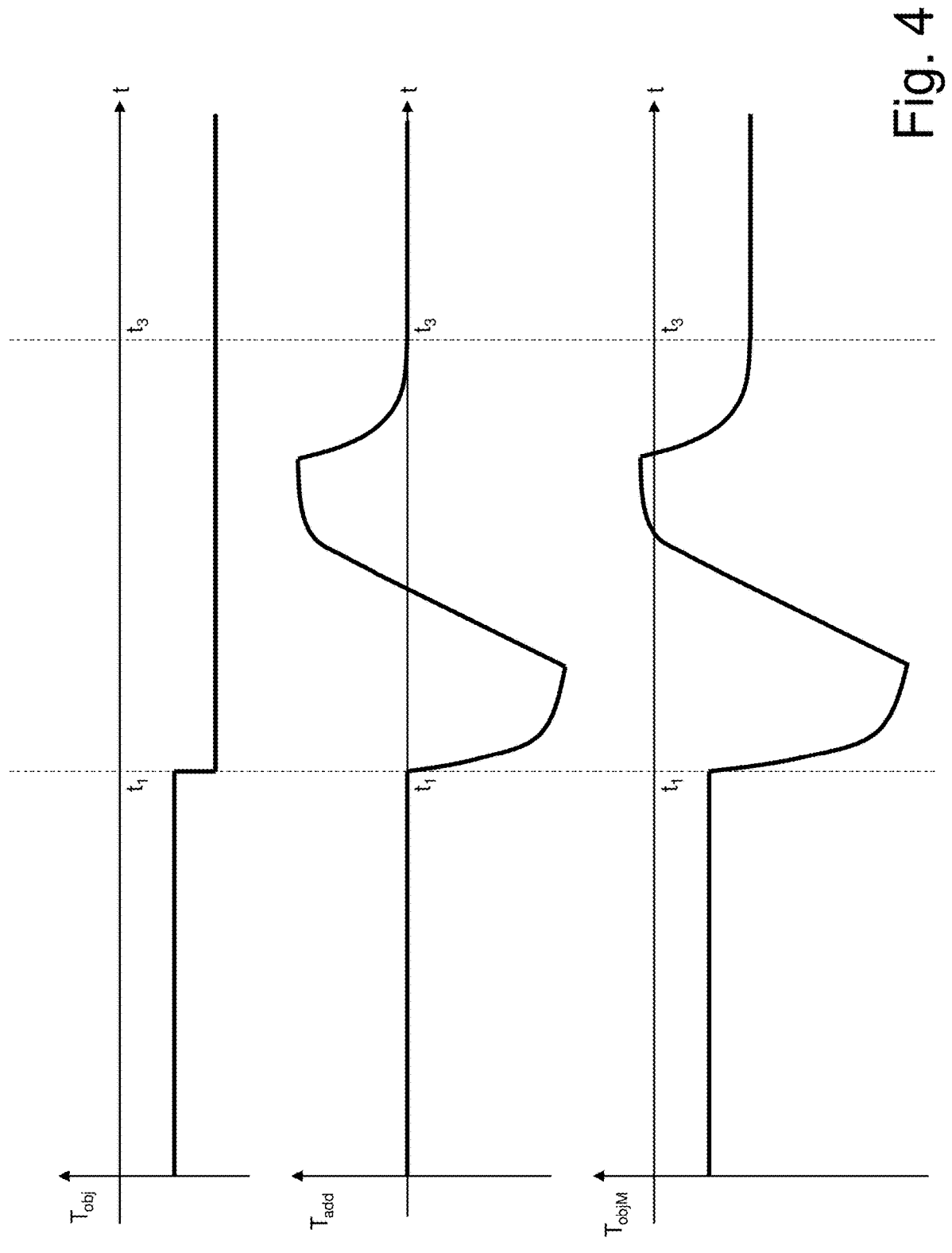
FIG. 4 illustrates graphs showing the evolution over time of a torque objective, of an additional torque profile, and of a torque objective changed in the case of a virtual downshift.

This situation is illustrated in FIGS. 2 and 4: in FIG. 2 at the time $t_1$ the driver presses the accelerator pedal 7 and selects a higher virtual gear acting upon the upshift control 9 (without changing the position of the accelerator pedal 7 which remains pressed) and hence the torque objective $T_{obj}$ increases (also in absolute value being positive) while in FIG. 4 at the time $t_1$ the driver does not press the accelerator pedal 7 and selects a lower virtual gear acting upon the downshift control 10 (without changing the position of the accelerator pedal 7 which remains released) and hence the torque objective $T_{obj}$ decreases (increasing in absolute value being negative).

Preferably, each virtual gear determines a limit acceleration profile (positive, i.e., generated by an engine torque, when the accelerator pedal 7 is at least partially pressed and negative, or generated by a braking torque, when the accelerator pedal 7 is released) upon variation of a longitudinal speed of the vehicle 1 and each limit acceleration profile increases as a rank of the virtual gear increases and vice versa (as described above). In other words, each limit acceleration profile entails a positive longitudinal acceleration (increasing as the rank of the virtual gear increases) when the accelerator pedal 7 is at least partially pressed and entails a negative longitudinal acceleration (decreasing as the rank of the virtual gear decreases) when the accelerator pedal 7 is released.

In use, the control unit 11 adds, with each change of the selected virtual gear, to the torque objective $T_{obj}$ an additional torque profile $T_{add}$ (illustrated in FIGS. 2-5) which is impulsive and temporary and temporarily changes the development of the torque objective $T_{obj}$.

In other words, as illustrated in FIGS. 2 and 4, when at the time $t_1$ the driver selects a higher virtual gear (as illustrated in FIG. 2) or lower virtual gear (as illustrated in FIG. 4), the control unit 11 adds to the torque objective $T_{obj}$ the additional torque profile $T_{add}$ which temporarily changes the torque objective $T_{obj}$; or, for the whole of the duration of the additional torque profile $T_{add}$ (which starts at the time $t_1$ and ends at the time $t_3$), the torque objective $T_{obj}$ is changed becoming a changed torque objective $T_{objM}$.

The total duration of the additional torque profile $T_{add}$ (in other words, the duration of the interval of time comprised between the times $t_i$ and $t_3$) is generally comprised between 200 and 600 ms and is preferably equal to 400 ms.

Figure 3:
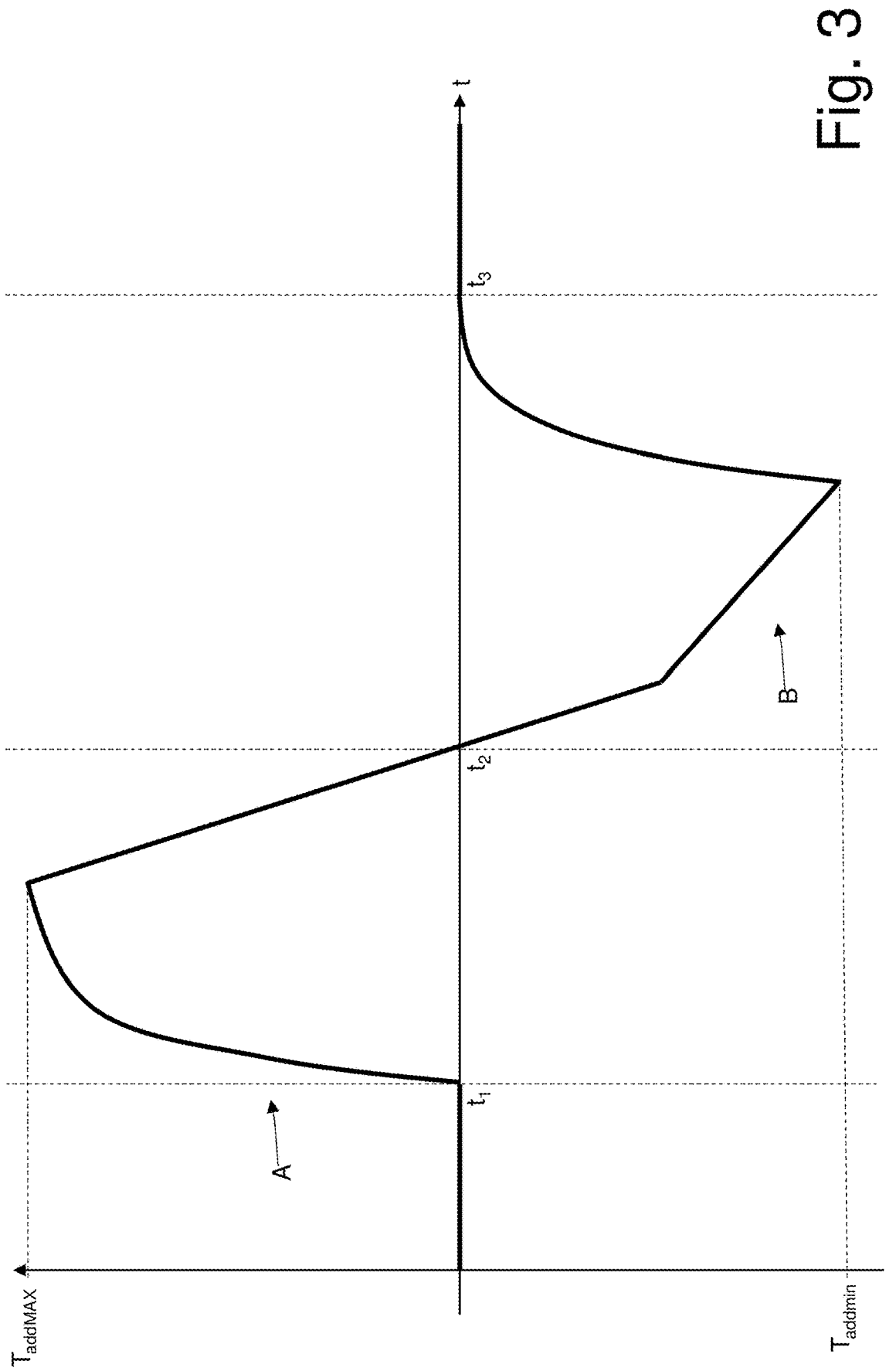
FIG. 3 illustrates a graph showing, in an enlarged scale, the evolution over time of the additional torque profile of FIG. 2.
Figure 5:
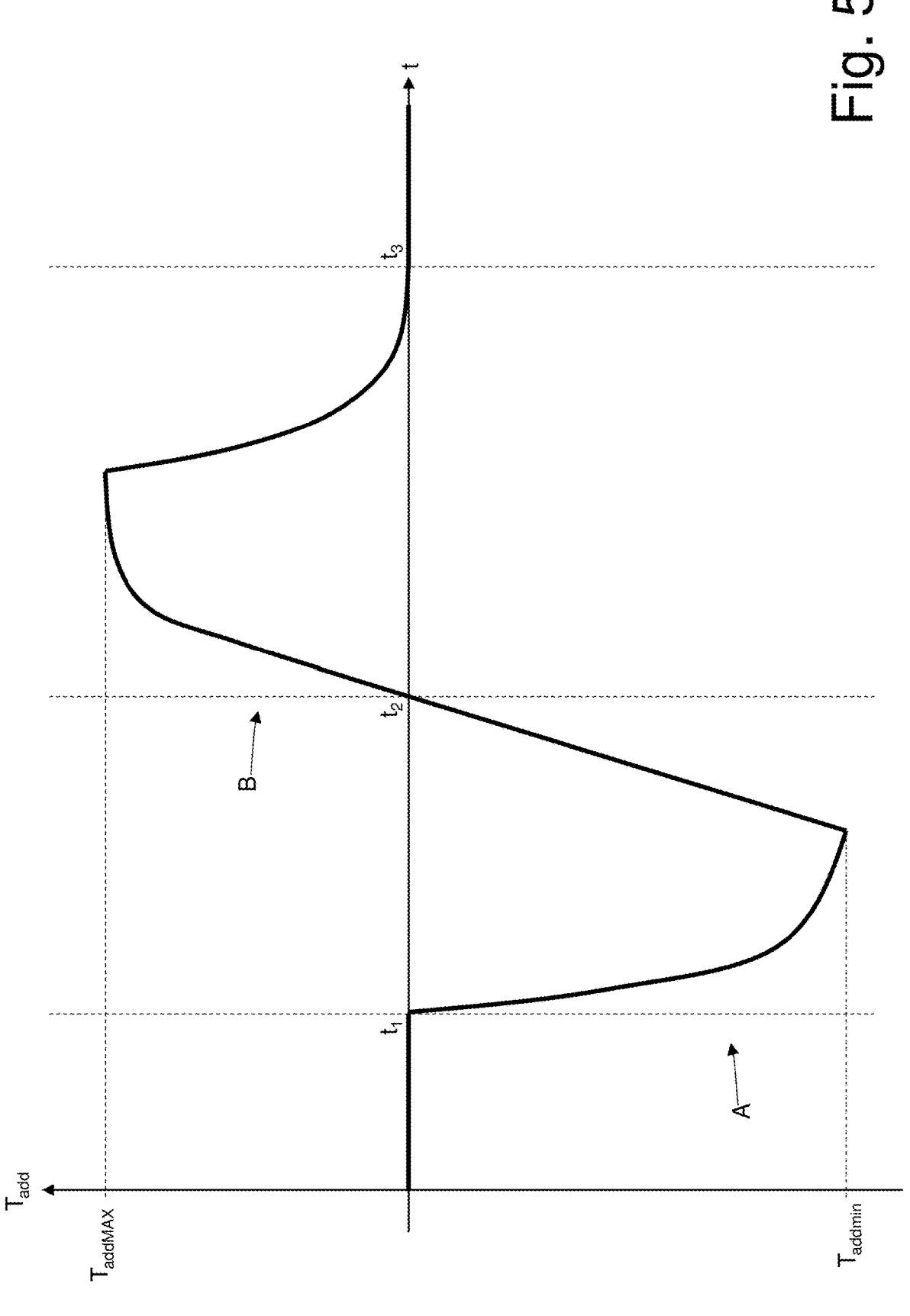
FIG. 5 illustrates a graph showing, in an enlarged scale, the evolution over time of the additional torque profile of FIG. 4.

As better illustrated in FIGS. 3 and 5, the additional torque profile $T_{add}$ comprises a start segment A having a first sign and an end segment B which immediately follows the start segment A and has a second sign which is contrary to the first sign; in other words, the additional torque profile $T_{add}$ entails alternating a torque increase/decrease with a following torque decrease/increase.

Preferably, each segment A or B entails a torque increase, in absolute value, from zero to a maximum value $T_{addMAX}$ or $T_{addmin}$ and a following torque decrease from the maximum value $T_{addMAX}$ Or $T_{addmin}$ to zero.

Preferably, each segment A or B comprises at least one linear variation over time and at least one exponential variation over time.

As illustrated in FIG. 3, if the change of the selected virtual gear is up, the start segment A entails an always positive torque and the end segment B entails an always negative torque. In particular, the start segment A entails an exponential torque increase from zero (at the time $t_1$) to a positive maximum value $T_{addMAX}$ immediately followed by a linear torque decrease from the maximum positive value $T_{addMax}$ to zero (at the time $t_2$); instead, the end segment B entails a linear torque decrease from zero (at the time $t_2$) to a minimum negative value $T_{addmin}$ immediately followed by an exponential increase from the minimum negative value $T_{addmin}$ to zero (at the time $t_3$).

According to the preferred (but not binding) embodiment illustrated in FIG. 3, the linear torque decrease from zero (at the time $t_2$) to the minimum negative value $T_{addmin}$ entails a greater start slope followed by a smaller end slope; in other words, the decrease is always linear but with differentiated decrease speed (slope, first time derivative): first faster and then slower.

As illustrated in FIG. 5, if the change of the selected virtual gear is down, the start segment A entails an always negative torque and the end segment B entails an always positive torque. In particular, the start segment A entails an exponential torque decrease from zero (at the time $t_i$) to a minimum negative value $T_{addmin}$ immediately followed by a linear torque increase from the minimum negative value $T_{admin}$ to zero (at the time $t_2$); instead, the end segment B entails a torque increase from zero (at the time $t_2$) to a maximum positive value $T_{addMAX}$ immediately followed by an exponential decrease from the maximum positive value $T_{addMAX}$ to zero (at the time $t_3$).

According to the preferred (but nonbinding) embodiment illustrated in FIG. 5, the torque increase from zero (at the time $t_2$) to the maximum positive value $T_{addMAX}$ entails a linear increase immediately followed by an exponential increase.

According to a possible embodiment, the maximum value $T_{addMAX}$ and the minimum value $T_{admin}$ are, in absolute value, constant. According to a different embodiment, the maximum value $T_{addMAX}$ and the minimum value $T_{admin}$ are, in absolute value, variable, for example, depending on the absolute value of the engine torque objective $T_{obj}$; in other words, the maximum value $T_{addMAX}$ and the minimum value $T_{admin}$ are, in absolute value, parametrized to the absolute value of the engine torque objective $T_{obj}$.

According to a possible embodiment and as illustrated in FIG. 3, in the case of upshift the maximum value $T_{addMAX}$ is, in absolute value, greater than the minimum value $T_{addmin}$.

According to a possible embodiment and as illustrated in FIG. 5, in the case of downshift the maximum value $T_{addMAX}$ is, in absolute value, smaller than the minimum value $T_{addmin}$.

The embodiments described herein can be combined with one another without departing from the scope of protection of the present invention.

The control method described above has numerous advantages.

Firstly, the control method described above allows the driver to personally adjust the torque delivered by the electric powertrain systems 3 so as to obtain a more engaging driving mode which is better associated with the sensation the driver desires in a certain moment or for a certain bend. In this way it is possible to engage the driver to a greater extent, obtaining behaviours of longitudinal and lateral dynamics anticipated or delayed with respect to the action of an automated electronic control system.

In particular, the control method described above makes possible to increase driving pleasure, by virtue of the fact that driving can be customized to a greater extent and that the jerk provided by the typical gearshift of a conventional car with an internal combustion engine and a clutch gearbox is once again produced. In other words, the control method described above allows the sporting effect of the accelerometric variations typical of a clutch gearbox to be simulated in a very realistic and engaging way; moreover, the control method described above allows innovative accelerometric variations that cannot be physically obtained by a clutch gearbox to be created, providing the driver with new and potentially very satisfying driving sensations.

To sum up, if during an upshift/downshift only a more or less progressive decrease/increase of the longitudinal acceleration/deceleration of the vehicle 1 is felt, the sensation transmitted to the driver is flat and not very involving as it is associated with modest performance (as it is similar to the sensations transmitted by an automatic transmission which is considered, rightly or wrongly, as not very sporting and high performance); instead, by creating, through the addition of the additional torque profile $T_{add}$, during the gearshift, an impulsive and clearly perceptible variation of the engine torque applied to the wheels 2, very pleasing and engaging sensations can be transmitted to the driver.

With the control method described above it is possible to avoid (frequent) use of the drive control, leaving the management of excessive torque to the discretion of the driver, who can always upshift or downshift to manage it, so as not to delegate performance entirely to an electronic control system.

Finally, the control method described above is simple and inexpensive to produce, as it does not require the addition of any physical components and can be implemented entirely via software by exploiting the architectures already normally present on the road vehicle 1. It is important to observe that the method described above does not require high computing power or a large amount of memory and hence can be implemented in a known control unit without the need for updates or upgrades to the hardware.

LIST OF REFERENCE NUMBERS OF THE FIGURES

1 road vehicle
2 wheels
3 powertrain system
4 electric machines
5 transmissions
6 steering wheel
7 accelerator pedal
8 brake pedal
9 upshift control
10 downshift control
11 control unit
$T_{obj}$ torque objective
$T_{add}$ additional torque profile
$T_{objM}$ changed torque objective
t time
$t_1$ time
$t_2$ time
$t_3$ time
$T_{addMAX}$ maximum value
$T_{addmin}$ minimum value
A start segment
B end segment

The invention claimed is:

1. A method to control an electric road vehicle (1); the control method comprises the steps of:

detecting a position of an accelerator pedal (7);

detecting an activation of an upshift control (9) or of a downshift control (10);

establishing a plurality of virtual gears, each capable of being selected by acting upon the upshift control (9) or upon the downshift control (10);

determining the selected virtual gear depending on the actions exerted upon the upshift control (9) or upon the downshift control (10);

determining a torque objective ($T_{obj}$) to be applied to the drive wheels (2) depending on the position of the accelerator pedal (7) and depending on the selected virtual gear; and adding, with each change in the selected virtual gear, to the torque objective ($T_{obj}$), an additional torque profile ($T_{add}$), which is impulsive and temporarily changes the development of the torque objective ($T_{obj}$);

wherein the additional torque profile ($T_{add}$) comprises a start segment (A) having a first sign and an end segment (B), which immediately follows the start segment (A) and has a second sign, which is contrary to the first sign;

wherein if the change in the selected virtual gear is up, the start segment (A) entails an always positive torque and the end segment (B) entails an always negative torque, and if the change in the selected virtual gear is down, the start segment (A) entails an always negative torque and the end segment (B) entails an always positive torque.

2. The control method according to claim 1, wherein each segment (A, B) entails a torque increase, in absolute value, from zero to a maximum value ($T_{addMAX}$, $T_{addmin}$) and a following torque decrease from the maximum value ($T_{addMAX}$, $T_{admin}$) to zero.

3. The control method according to claim 1, wherein each segment (A, B) comprises at least one linear variation over time and at least one exponential variation over time.

4. The control method according to claim 1 wherein if the change in the selected virtual gear is up:

the start segment (A) entails an exponential torque increase from zero to a maximum positive value ($T_{addMAX}$) immediately followed by a linear torque decrease from the maximum positive value ($T_{addMAX}$) to zero; and the end segment (B) entails a linear torque decrease from zero to a minimum negative value ($T_{addmin}$) immediately followed by an exponential increase from the minimum negative value ($T_{addmin}$) to zero.

5. The control method according to claim 4, wherein the linear torque decreases from zero to the minimum negative value ($T_{addmin}$) entails a greater start slope followed by a smaller end slope.

6. The control method according to claim 4, wherein the maximum value ($T_{addMAX}$) is, in absolute value, greater than the minimum value ($T_{addmin}$).

7. The control method according to claim 1, wherein if the change in the selected virtual gear is down:

the start segment (A) entails an exponential torque decrease from zero to a minimum negative value ($T_{addmin}$) immediately followed by a linear torque increase from the minimum negative value ($T_{addmin}$) to zero; and the end segment (B) entails a torque increase from zero to a maximum positive value ($T_{addMAX}$) immediately followed by an exponential decrease from the maximum positive value ($T_{addMAX}$) to zero.

8. The control method according to claim 7, wherein the torque increase from zero to the maximum positive value ($T_{addMAX}$) entails a linear increase immediately followed by an exponential increase.

9. The control method according to claim 7, wherein the maximum value ($T_{addMAX}$) is, in absolute value, smaller than the minimum value ($T_{addmin}$).

10. The control method according to claim 1, wherein:

each virtual gear determines a limit acceleration profile upon variation of a longitudinal speed of the vehicle (1); and each limit acceleration profile increases as a rank of the gear increases and vice versa.

11. The control method according to claim 10, wherein each limit acceleration profile entails a positive longitudinal acceleration, when the accelerator pedal (7) is at least partially pressed, and entails a negative longitudinal acceleration, when the accelerator pedal (7) is released.

12. The control method according to claim 1, wherein the torque objective ($T_{obj}$) is positive, when the accelerator pedal (7) is at least partially pressed, and is negative, when the accelerator pedal (7) is released.

* * * * *